(12) United States Patent
McCloskey

(10) Patent No.: US 9,582,207 B1
(45) Date of Patent: Feb. 28, 2017

(54) QUEUED PARALLEL PROCESSING OF BLOCK HANDLING FOR VIRTUAL TAPE CONTROL UNITS

(71) Applicant: EMC Corporation, Hopkinton, MA (US)

(72) Inventor: Larry W McCloskey, Billerica, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 14/588,441

(22) Filed: Jan. 1, 2015

(51) Int. Cl.
*G06F 12/00* (2006.01)
*G06F 3/06* (2006.01)
*G06F 9/455* (2006.01)

(52) U.S. Cl.
CPC .......... *G06F 3/0619* (2013.01); *G06F 3/0641* (2013.01); *G06F 3/0659* (2013.01); *G06F 3/0682* (2013.01); *G06F 9/455* (2013.01)

(58) Field of Classification Search
CPC .... G06F 3/0619; G06F 3/0659; G06F 3/0682; G06F 3/0641; G06F 9/455
See application file for complete search history.

(56) References Cited

U.S. PATENT DOCUMENTS

| | | | |
|---|---|---|---|
| 8,667,239 B1 | 3/2014 | McCloskey et al. | |
| 8,775,756 B1 | 7/2014 | McCloskey et al. | |
| 8,793,452 B1 | 7/2014 | McCloskey et al. | |
| 2004/0153614 A1* | 8/2004 | Bitner | G06F 3/0604 711/162 |
| 2004/0205312 A1* | 10/2004 | Zlotnick | G06F 11/2069 711/162 |

* cited by examiner

*Primary Examiner* — Shawn X Gu
(74) *Attorney, Agent, or Firm* — Staniford Tomita LLP

(57) ABSTRACT

Embodiments are described for a method and system for performing data writes in a virtual tape emulation system. A parallel processing component receives data blocks from a mainframe host and upon receipt provides indication to the mainframe that a current block is received so that the mainframe can proceed to send the next block while the current block is processed. The component initiates parallel processing of the received block in a separate task, and as the operation completes, the data is written to non-tape media in a block-wise manner.

17 Claims, 5 Drawing Sheets

TABLE 2

| Number of Devices Concurrently Writing | Number of Concurrent Parallel Compressions per Device |
|---|---|
| 1 | 20 |
| 2 | 10 |
| 3 | 6 |
| 4 | 5 |
| 5 | 4 |
| 6 | 3 |
| 7 | 3 |
| 8 or more | 0 |

FIG. 4

QUEUED PARALLEL PROCESSING OF BLOCK HANDLING FOR VIRTUAL TAPE CONTROL UNITS

TECHNICAL FIELD

Embodiments are generally directed to computer backup systems, and more specifically to speeding data writes in virtual tape emulators by parallelizing block handling operations.

BACKGROUND

Large-scale mainframe computers continue to be used extensively across many industries. Historically, tape storage has been used to provide permanent and temporary data protection services to those mainframes. In such environments, it is not uncommon for mainframe tape libraries to hold hundreds of Terabytes (TB) of data spread across tens of thousands of tape volumes.

Virtual tape emulation (VTE) products such as DLm available from EMC Corporation of Hopkinton, Mass. Can be used to emulate a given number of tape volumes to the mainframe using disk drives as the storage media instead of magnetic tape. As a mainframe-based application writes data to what it believes is a tape drive, that data is actually stored as a tape volume image on direct access storage device such as a disk array subsystem. Each individual tape volume written by the mainframe becomes a single disk on the filesystem on the disk array. Such VTE products ultimately allow the operators of mainframe data centers to move from a tape-based backup solution to a disk-based backup solution, thus leveraging present low-cost disk technology to provide cost efficient data storage solutions.

In a VTE system, the mainframe host writes data to the virtual tape drive using the same commands as it would as if it were writing to an actual magnetic tape drive. The normal flow of data written from a mainframe host to a virtual tape drive (such as the EMC DLm) is a sequential process in which the mainframe writes a data block, the data block is received by the virtual tape drive, the data block is compressed, the data block is written to the virtual tape file on the virtual tape server. After the write operation, an acknowledgement is sent to the host, at which time the process repeats for the next data block. In general, data compression is the most time-consuming step of this process, and is the most significant factor affecting performance. Thus, the sequential process of present VTE data write processes limits the overall system performance to the slowest step in the process, which is the data compression step. Other block-level data handling operations can also benefit from parallelization, including encryption, deduplication, compression checks, data rearrangement, and the like.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is a table that illustrates the relationship between the number of devices concurrently writing to disk and the number of concurrent parallel operations per device in an example implementation.

DETAILED DESCRIPTION

Figure 1:
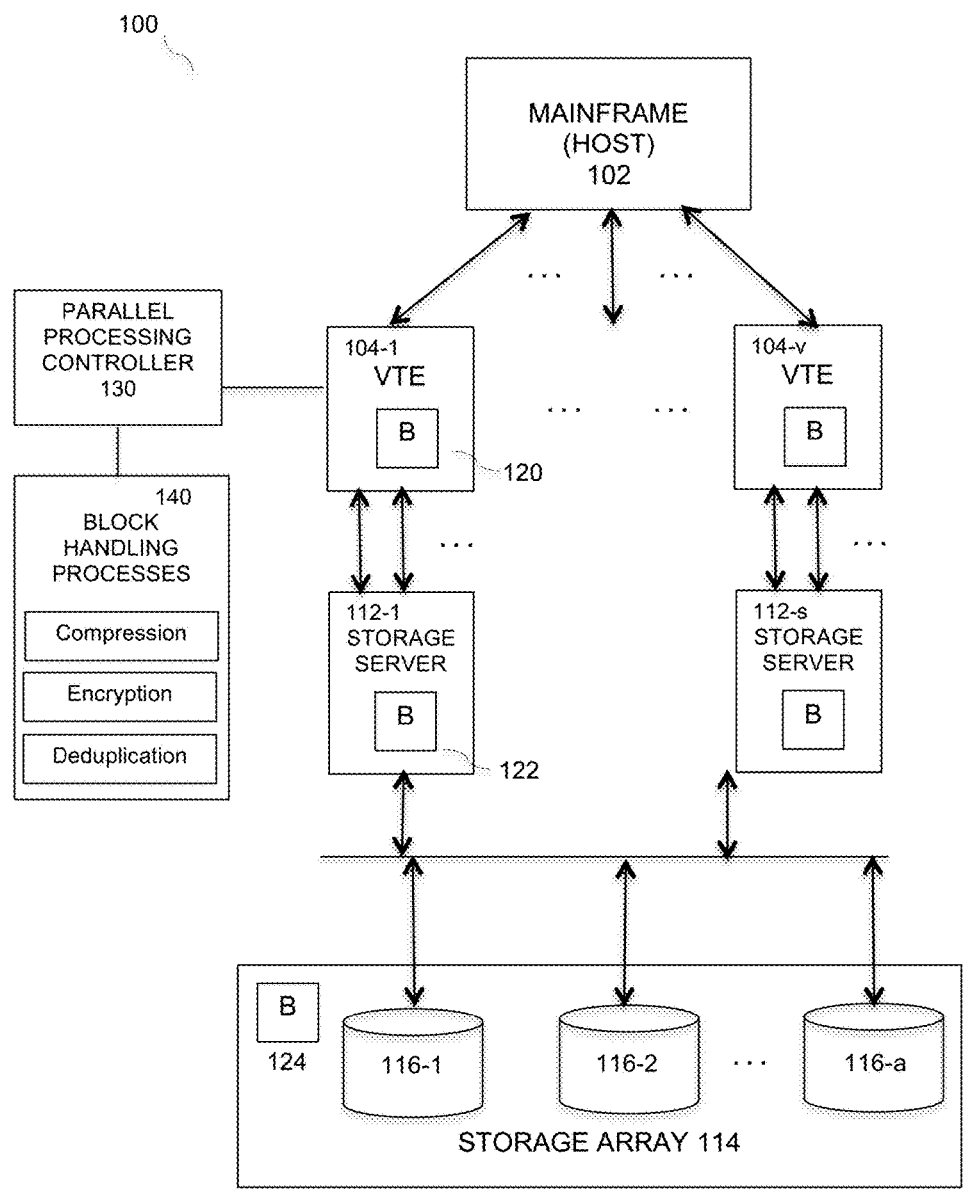
FIG. 1 is a high-level block diagram of a tape emulation system that may include embodiments of a parallel compression process.

A detailed description of one or more embodiments is provided below along with accompanying figures that illustrate the principles of the invention. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be appreciated that the embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for improving the write performance of virtual tape backup systems by compressing multiple data blocks at the same time to significantly increase backup performance. The process accepts a number of data blocks sequentially from the host, starts a separate, parallel compression task for each, then writes the data blocks sequentially to disk as each compression task completes. Some embodiments of the invention involve the optimization of backup software in a main-frame based system, such as a client-server network, local area network (LAN), wide area network (WAN) or larger scale computer network system; however, those skilled in the art will appreciate that the invention is not limited thereto. Thus, aspects of the one or more embodiments described herein may be implemented on one or more computers executing software instructions, and the computers may be networked in a client-server arrangement or similar distributed computer network.

Embodiments are generally configured for operation in a mainframe computer system in which a mainframe computer writes data to non-tape storage devices through an tape emulation system that allows tape-based commands to be used for storing data on other types of storage media, such as disks. Mainframe computers typically manipulate data at a block-level, and block data is predominately processed in a serial manner through most present tape emulation systems. To improve the performance of backup operations that involve mainframe (or host) write operations to the storage media, embodiments are described for implementing parallelized execution of block level data processing operations.

FIG. 1 is a high-level block diagram showing a data processing environment in which parallel processing of block handling can be implemented in a virtual tape emulator according to some embodiments. The environment 100 includes a host, also called a mainframe 102, and one or more virtual tape emulation (VTE) subsystems 104-1 to 104-v such as the Disk Library for mainframe (DLm) product available from EMC Corporation of Hopkinton, Mass. The tape emulation subsystem(s) 104 connect to the mainframe 102 via high speed FICON (fiber connection) or ESCON (enterprise system connection) channel data connection(s). Despite using direct access storage devices such as disk drive arrays 116-1 to 116-a as the mass media, they appear to the mainframe 102 as physical tape drives, and therefore execute typical tape-like commands and respond to such commands in the same way that a physical tape drive would respond. This means that existing work processes based on tape management systems and applications can run on the mainframe 102 without any modifications.

An example VTE 104-1 operates as an input/output controller between the mainframe 102 and a disk based storage subsystem 116-1, . . . , 116-A that can, for example, be a standard open-systems disk storage subsystem. The VTE 104-1 can thus be said to emulate a given number of virtual tape volumes to the mainframe 102. The VTEs 104 include a local buffer (B) 120 for use emulating tape commands. In an embodiment, the buffer 120 is a buffer pool of buffers allocated to the respective VTE upon startup and used to facilitate parallel processing of data blocks through the system.

The backend storage subsystem stores the data as one of a plurality of tape volume images. Each individual tape volume image written by the mainframe 102, can for example, be a single disk file.

The tape emulation subsystem may consist of an internal local area network (LAN) and one or more storage servers 112-1 to 112-s that manage the backend disk array(s) 116-1 to 116-a. It should be understood that the backend storage array 114 having storage disks 116-1 to 116-a may implement a hierarchy of storage protocols, such as Redundant Array of Independent Disks (RAID), storage array network (SAN), Network-attached Storage (NAS), Direct-attached Storage (DAS), data deduplication, replication, garbage collection, and/or other storage management functions that may not be visible to or under the control of the storage servers 112, and are not visible or under the control of the VTE 104 or the mainframe 102. The storage servers may typically include one or more internal buffers 122 in which they store data temporarily as it is managed and passed back and forth between the storage arrays 116 and the VTE 104.

In a typical implementation of system 100, one or more block-level processes 140 are performed by the VTE subsystems, including compression, encryption, deduplication, and other possible block handling processes. In current systems, these processes are configured operate serially in a block-by-block fashion, thus introducing performance delays. For the embodiment of FIG. 1, a parallel processing controller 130 controls or manages the parallel execution on a block-wise basis of each these processes using the multiprocessor architecture or resources of the hardware systems.

For the embodiment of FIG. 1, component 130 performs a parallel block management function that effectively takes data blocks from the mainframe 102, tells the mainframe that a current block is received so that the mainframe can proceed to send the next block. This comprises an early status signal that allows the mainframe to send the next block while processing of a current block is being performed. The component 130 then starts parallel processing of the received block in a separate task, and as the operation completes, the data is written to the disk or other media one block at a time. The component 130 may be implemented as a functional component that resides in each VTE 104-1 to 104-v, or it may be a separate functional component 100 that is functionally coupled to the VTEs 104-1 to 104-v and/or the storage servers 112-1 to 112-s. The component 130 makes use of certain multiple or parallel processing architecture that may be implemented in one or more hardware adapters of system 100. The parallel processing controller 130 may also include a function that adjusts the number of parallel threads that are invoked for a particular operation. For example, if the system utilizes a single tape drive, the system may be configured to execute 20, or a similar number of parallel operations at same time. As more drives are used, the number operations may be reduced so as not to not overload the adapter.

As shown in FIG. 1, the block-handling operation may be any operation that traditionally involves the serial processing of data blocks transmitted from the mainframe 102, such as compression, encryption, data deduplication, data rearrangement, checksum calculations, compression checks, and the like.

Parallel Compression Operation

With respect to compression operations and as described previously, on a given VTE device, all of the activities associated with a Write CCW (channel command word) have historically been performed in a serial process in which the host sends the Write CCW and the associated data, the VTE compresses (and/or encrypts) the data, the data is written to the back-end filesystem, and the VTE returns status to the host so that the next CCW can proceed. In an example write-job scenario, the amount of time spent in the serial processing of a write CCW may be illustrated in the following table (Table 1), as follows (all times in microseconds):

TABLE 1

| | |
|---|---|
| Average Compression (hardware): | 192 |
| Average Write to Back-end: | 76 |
| Average Test Compressed Data: | 43 |
| Average CRC Calculations: | 41 |
| Average Total Write CCW Time: | 388 |

As can be seen in Table 1, compression is the longest single component of the Write CCW processing, taking 192 microseconds out of a total write time of 388 microseconds, or just about 50%. The times shown above are provided for example only and are intended to illustrate relative times for various operations in a CCW write in a particular scenario.

To minimize the time delay caused by serial execution of the compression operation, the parallel processing controller utilizes certain parallel processing components in the system 100. For example, in an embodiment, the compression operation utilizes a hardware compression adapter that includes a multi-processor system that is capable of performing a number of concurrent operations. One such example compression process is the open standard GZIP compression algorithm that uses a hardware compression adapter provided by Comtech Aha Corp., though other similar compression algorithms and hardware adapters are also possible.

Figure 2:
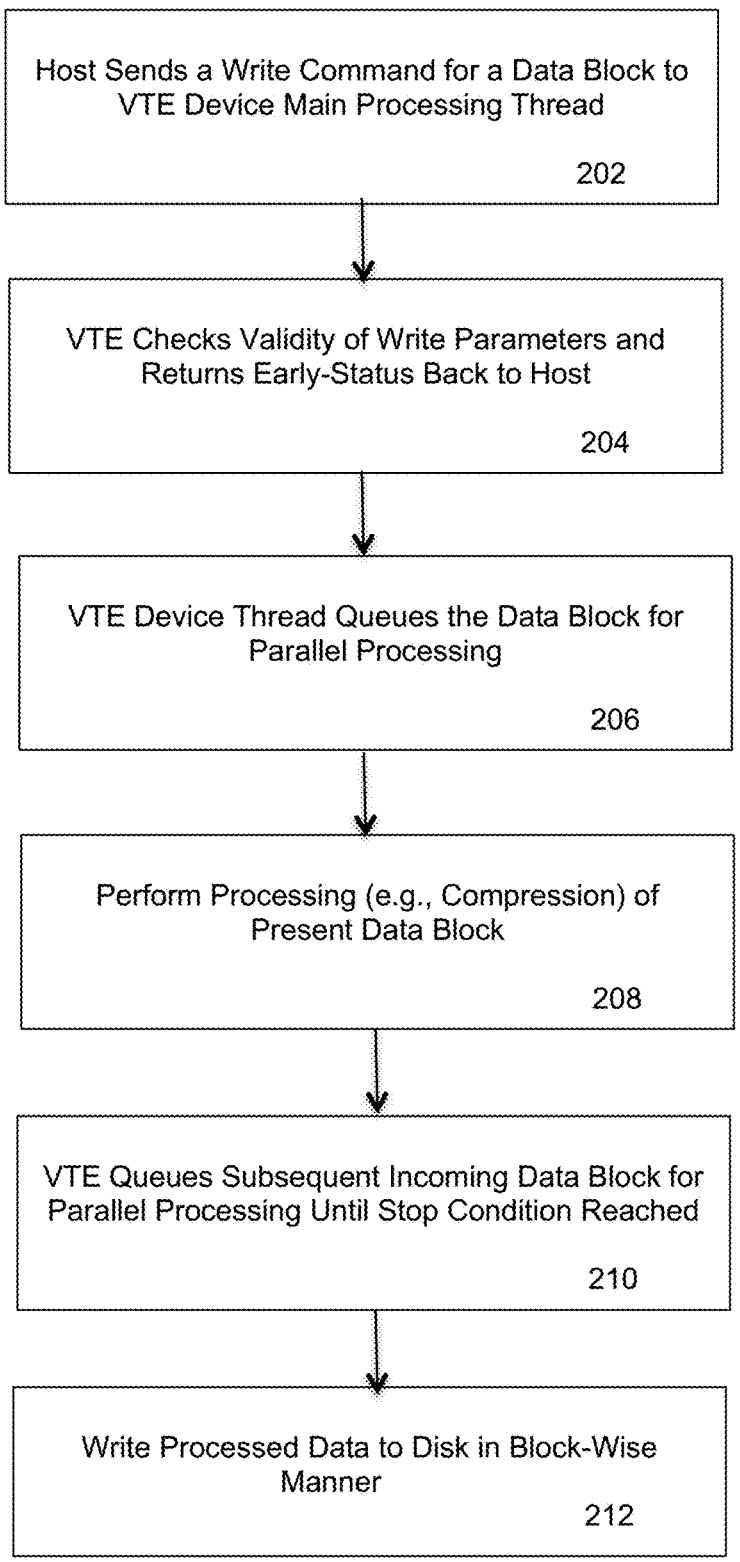
FIG. 2 is a flow diagram of the parallel processing of block handling in a virtual tape environment, under an embodiment.

In an embodiment, the parallel processing controller changes the compression, encryption, and test-compressed data portion of a Write CCW chain from a serial, per block process into parallel processing of multiple blocks within the chain. FIG. 2 is a flow diagram of the parallel processing of block handling, under an embodiment. Flow diagram 200 illustrates the logic steps for a compression operation. In act 202, the host (mainframe) 102 sends the Write CCW and associated data, which is passed from the channel driver to the VTE device's main processing thread. The VTE does a check of the CCW validity to verify parameters such as valid flags, valid length, write mode, and so on. An early-status is returned to the host so that it can finish the current CCW and send the next one as soon as it is ready to do so, act 204. The VTE device thread then queues the data block for parallel processing, act 206. It starts a parallel-compression thread dedicated to this block, which asynchronously compresses the data, block 208. Other optional operations, such as encryption, and test compressed data operations can also be performed on the block in conjunction with or after the parallel compression operation. This series of operations is distinctly advantageous over present systems that simply compress (and optionally encrypt) the data and write it to disk in a serial manner. Once the parallel-compression thread is started, the device thread is done processing the block, and returns to read the next CCW from the channel adapter.

The VTE continues to queue incoming blocks and start a parallel-compression thread for each until any of the following occurs, act 210: (1) the maximum number of parallel-compression blocks per device has been reached (the maximum number may be any number from 1 to 20, or more if practical); (2) an end-of-chain is reached (e.g., a chain-Broken message received from the channel driver); (3) any CCW other than a write CCW is received from the channel; or (4) an error message (e.g., errorPacket) is received from the channel driver. When any of the above conditions (1-4) occurs, each of the previously queued blocks is written to disk after its parallel compression thread is finished with it. The processed data is then written to the storage media (disk) in a block-wise manner, act 212.

To facilitate parallel compression, the VTE devices include specific CCW buffer management components, according to an embodiment. In present systems, there is generally just one set of write buffers (one each for the uncompressed, compressed, and encrypted block) associated with each DEVBLK (i.e. per device); and all the fields that describe these buffers, such as the pointers to the buffers, their length, and compression and encryption flags reside in the DEVBLK. In a present implementation, in order to maintain multiple sets of buffers per device for parallel processing, all of the information that described the Write CCW buffers is moved from the DEVBLK to a new buffer information structure. This may be a modified version of a structure that is used only to convey information to and from the compression, decompression, encryption and decryption functions. A pool of buffers and an array of these structures are allocated for each device at startup time. Each device has an array of a number (e.g., 20) of these structures. The number of structures in the array represents the limit concurrent parallel compressions per device (e.g., 20 concurrent parallel compressions for 20 structures).

Figure 3:
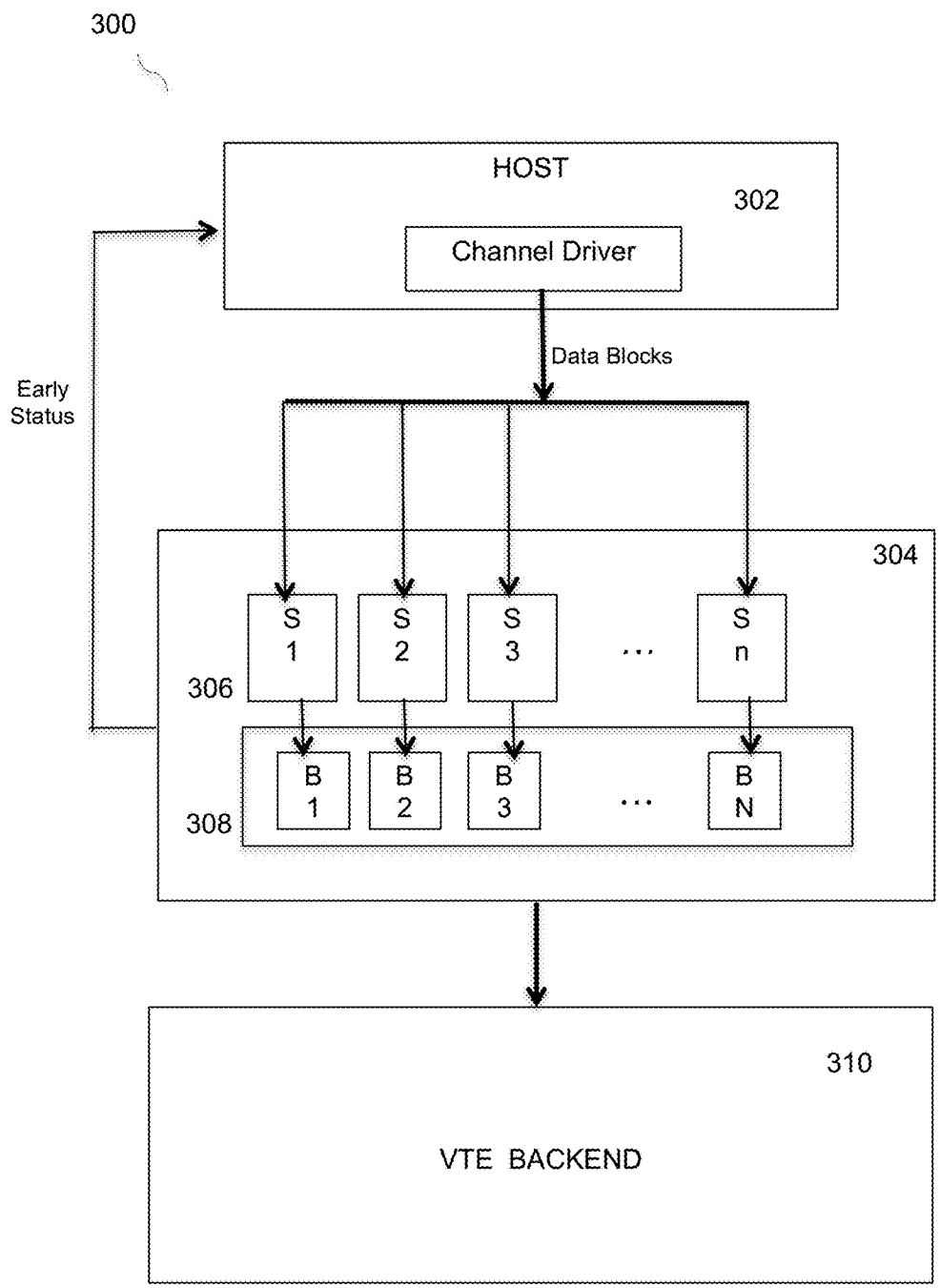
FIG. 3 is a block diagram that illustrates a system illustrating a parallel block-handling process, under an embodiment.

As each block is read from the channel driver, its data and all the information about this buffer is stored into the next structure. As each block is passed from function to function, this structure is used to maintain all the information about the block as it makes its way from channel to back-end, including through parallel compression. FIG. 3 is a block diagram that illustrates a system illustrating a parallel block-handling process, under an embodiment. As shown in system 300, host mainframe 302 transmits blocks to be written through a channel driver (channel adapter). The data blocks are input to a parallel processing controller component 304 for interfacing to a VTE backend element 310. This component contains a number (N) of structures 306 (S1 to Sn) and a buffer pool 308 that contains the same number of buffers. The buffers 308 may be implemented as data storage within the structures 304 or as separate coupled memory elements, as shown. Likewise, the parallel processing controller 304 may be implemented within or as part of a VTE, or it may be provided as a separate interface element, as shown. The buffer pool 308 and structure array 310 are allocated for the VTE device at startup time, and a set of these buffers and structures are instantiated for each VTE in the system. A feedback loop from the component 304 to the host provides the early status signal back to the host 302 so that it can prepare the next block for transmission while a present block is being processed in parallel by component 304.

As shown in FIG. 1, an overall backup system 100 may include a number of VTE devices coupled between the host and the storage devices (media). In an embodiment, the maximum number of parallel compressions that is performed on a single VTE device corresponds to the number of structures/buffers (e.g., 20) in the VTE. This maximum number is generally selected based on the optimum peak performance for a single device. As more devices are used for writing, using the maximum of number of parallel compressions would quickly overrun the capability of the platform's CPU and hardware compression adapter, so the number of concurrent parallel compressions per device is automatically reduced as more devices are writing. This represents an automatic throttling function of the system. Table 2 of FIG. 4 shows this automatic throttling behavior, under an embodiment. FIG. 4 illustrates the relationship between the number of devices concurrently writing to disk and the number of concurrent parallel operations (e.g., compressions) per device. As can be seen in Table 2, that number of devices times the number of concurrent operations equals about 20 (e.g., 18-21) in all instances, and that above 8 devices, the benefit of parallelization generally falls away, so that at that point, traditional serial processing of the data blocks may be more beneficial. The values provided in FIG. 4 are intended to be for purposes of example only, and different values may be possible based on system constraints and requirements.

In an embodiment, a command is defined (e.g., SET PARALLELCOMPRESSION=nn/ON/OFF) to change the maximum number of concurrent parallel compressions that a given device can perform. The startup default value may be set to a value such as 20, which is also the maximum value. Parallel compression is turned off if this parameter is set to 0. Instead of a numeric value, a VTE also accepts ON which sets the maximum value of 20, and OFF which sets the value to 0. Note any default value that yields the best performance may be selected, depending on the capabilities and constraints of the system.

A configuration parameter can also be used to configure the parallel compression feature. This configuration parameter sets the maximum number of concurrent parallel compressions that a given device can perform. In the example case above, the startup default value is 20, which is also the maximum value. Parallel compression is turned off if this parameter is set to 0. Instead of a numeric value, the VTE can also be configured to accept ON which sets the maximum value of 20, and OFF which sets the value to 0.

The number of concurrent parallel compressions per device is a user tunable parameter that can be user selected, set by the system, or automatically determined based on system capabilities, load, data throughput requirements, minimum write rates, and so on. Likewise, the number of devices concurrently writing is generally a fixed number based on actual device count, but this can also be an automatically defined number based on system configuration and application requirements.

Parallel Deduplication

In an embodiment, and as shown in FIG. 1, one block handling process 140 in addition to compression and encryption is a deduplication process. Such a deduplication process comprises an Assisted Mainframe Deduplication (AMDD) process data to help the deduplication process in the tape virtualization environment. Thus, certain embodiments of the parallel block handing process are adapted to work with deduplication backup systems as well as non-deduplication systems. In an embodiment, the AMDD process rearranges the data within the blocks to facilitate deduplication algorithms applied to the data. The AMDD uses knowledge about the mainframe to rearrange the blocks such that data that can be deduplicated is aggregated and separated from data that cannot be deduplicated. Such a process and system of implementing this process is described in U.S. Pat. No. 8,667,239, issued on Mar. 4, 2014 and assigned to the assignee of the present application, and which is hereby incorporated by reference in its entirety.

Figure 5:
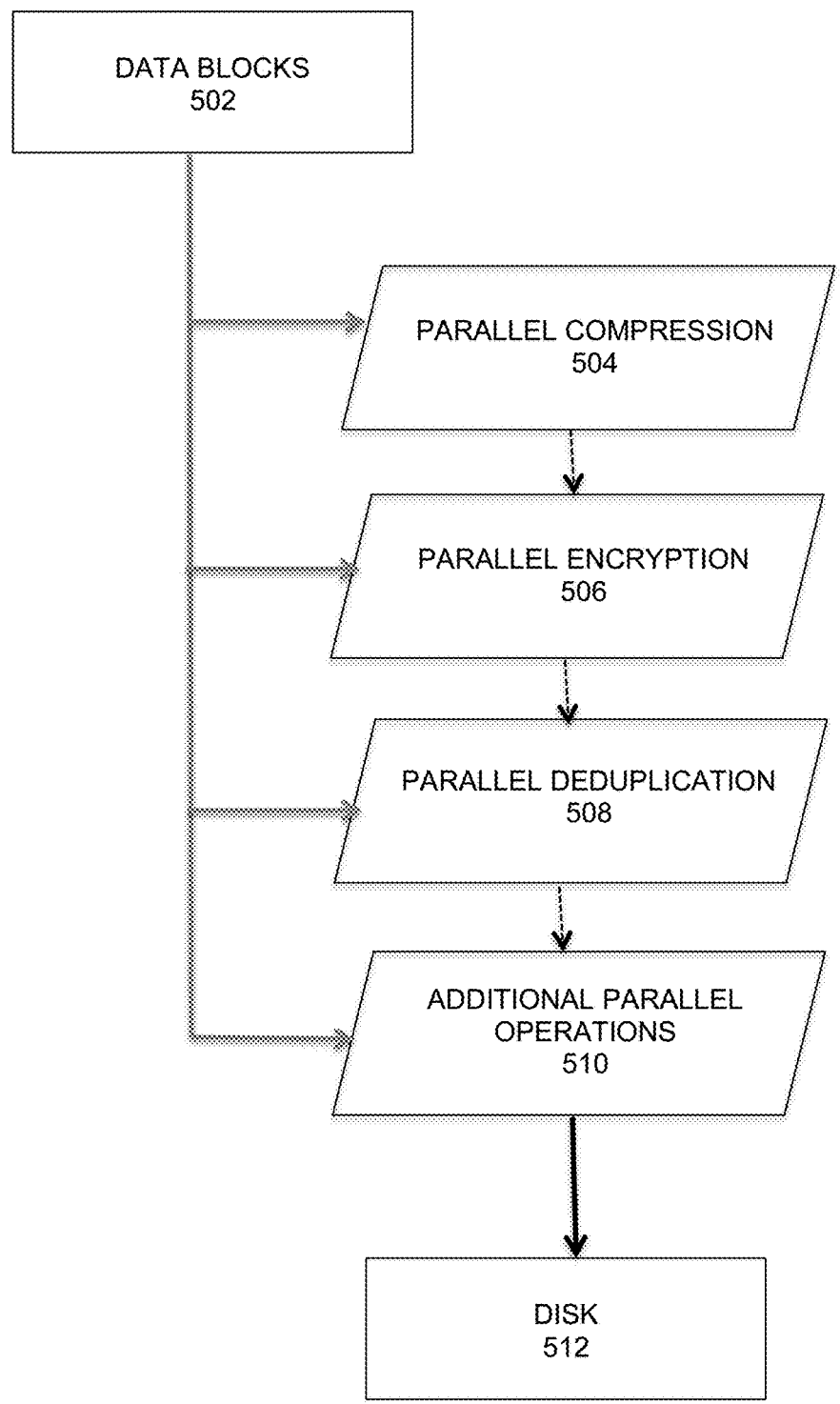
FIG. 5 illustrates the arrangement of different parallelized operations, under an embodiment.

As described above, the parallel block handling process may be applied to one or more different block-level operations, such as compression, encryption, deduplication, and other operations. Such operations may be performed individually or in together in processing blocks to be written. FIG. 5 illustrates the arrangement of different parallelized operations, under an embodiment. As shown in FIG. 5, data blocks 502 to be written to disk 512 are input to a parallel compression operation 504, which is typically the first and primary operation to be performed if optimum write performance is desired. An encryption process 506 then typically follows. This may then be followed by an AMDD (or other deduplication) process 508, and any other parallelized operation 510 may also be performed, such as data rearrangement, checksum calculations, and so on. Any or all of the operations 504-510 may be performed together or separately on the data blocks prior to writing to disk 512.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:
1. A method comprising:
receiving, in a virtual tape emulation (VTE) device, a data block of a plurality of data blocks from a host mainframe computer, wherein each block of the plurality of data blocks is processed in a dedicated processor of a multi-processor system;

transmitting a receive status of the received data block back to the host upon receipt of the received data block;

initiating a parallel execution thread for the received data block to asynchronously process the received data block through a parallelized operation; and queuing additional data blocks of the plurality of blocks for the parallel execution thread until a stop condition is reached, and wherein the received data block and each of the additional data blocks is processed through a buffer pool and structure array corresponding to a maximum number of parallel processing blocks.

2. The method of claim 1 wherein the parallelized operation is selected from the group consisting of: compression, encryption, deduplication, data rearrangement, and checksum calculation.

3. The method of claim 2 wherein the stop condition comprises one of: reaching a maximum number of parallel-processing blocks per device, reaching an end-of-chain condition, receiving a different non-write command, and receiving an error packet.

4. The method of claim 1 further comprising writing the processed block and additional data blocks to a storage media in a block-wise manner.

5. The method of claim 1 wherein the maximum number is determined through one of an automated process that incorporates user input, and a fixed setting defined in the VTE.

6. The method of claim 1 wherein the data blocks are generated through a channel command word (CCW) operation.

7. The method of claim 6 further comprising performing a CCW validity check to verify parameters including flags, length, and write mode.

8. The method of claim 1 further comprising writing the data blocks to non-tape storage media coupled to the mainframe, wherein the virtual tape emulation device facilitates the use of tape-based storage commands to process data.

9. The method of claim 2 wherein the deduplication comprises an assisted mainframe deduplication that is configured to rearrange data within the received data block to aggregate data that is capable of being deduplicated separately from data that is not capable of being deduplicated.

10. A system comprising:

a virtual tape emulation (VTE) device receiving a data block of a plurality of data blocks from a host mainframe computer, and transmitting a receive status of the received data block back to the host upon receipt of the received data block; and a parallel processing component initiating a parallel execution thread for the received data block to asynchronously process the received data block, and queue additional data blocks of the plurality of blocks for the parallel execution thread until a stop condition is reached, wherein the parallel processing component comprises an buffer pool and structure array, and wherein a number of buffers in the buffer pool and number of structures in the structure array dictate how many concurrent operations may be executed by the VTE device.

11. The system of claim 10 wherein the parallel processing component is integrated within the VTE device.

12. The system of claim 10 wherein the buffer pool and structure array are instantiated for the VTE upon startup of the system.

13. The system of claim 10 wherein the VTE is one of a plurality of VTE devices in a system coupling the host mainframe computer to a storage medium.

14. The system of claim 10 wherein the number of buffers in the buffer pool and number of structures in the structure array is determined through one of an automated process that incorporates user input, and a fixed setting defined in the VTE.

15. The system of claim 10 wherein the received data block is processed through at least one parallelized operation selected from the group consisting of: compression, encryption, deduplication, data rearrangement, and checksum calculation.

16. The method of claim 15 wherein the stop condition comprises one of: reaching a maximum number of parallel-processing blocks per device, reaching an end-of-chain condition, receiving a different non-write command, and receiving an error packet.

17. A computer program product comprising a non-transitory computer usable medium having machine readable code embodied therein for:

receiving, in a virtual tape emulation (VTE) device, a data block of a plurality of data blocks from a host mainframe computer, wherein each block of the plurality of data blocks is processed in a dedicated processor of a multi-processor system;

transmitting a receive status of the received data block back to the host upon receipt of the received data block;

initiating a parallel execution thread for the received data block to asynchronously process the block through a parallelized operation; and queuing additional data blocks of the plurality of blocks for the parallel execution thread until a stop condition is reached, and wherein the received data block and each of the additional data blocks is processed through a buffer pool and structure array corresponding to a maximum number of parallel processing blocks.

* * * * *